(12) United States Patent
Tsutsui et al.

(10) Patent No.: US 12,073,516 B2
(45) Date of Patent: Aug. 27, 2024

(54) INFORMATION PROCESSING DEVICE AND METHOD FOR DISPLAYING AR OBJECT AT ACCURATE POSITION

(71) Applicant: SONY GROUP CORPORATION, Tokyo (JP)

(72) Inventors: Shintaro Tsutsui, Tokyo (JP); Gen Hamada, Tokyo (JP); Keijiroh Nagano, Tokyo (JP); Tomohiko Gotoh, Tokyo (JP); Masayuki Inoue, Tokyo (JP); Hidenori Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 144 days.

(21) Appl. No.: 17/754,213

(22) PCT Filed: Sep. 23, 2020

(86) PCT No.: PCT/JP2020/035751
§ 371 (c)(1),
(2) Date: Mar. 28, 2022

(87) PCT Pub. No.: WO2021/065607
PCT Pub. Date: Apr. 8, 2021

(65) Prior Publication Data
US 2022/0327787 A1    Oct. 13, 2022

(30) Foreign Application Priority Data

Oct. 3, 2019   (JP) .................................. 2019-183024

(51) Int. Cl.
*G06T 19/00*    (2011.01)
*G06T 7/70*     (2017.01)

(52) U.S. Cl.
CPC .............. *G06T 19/006* (2013.01); *G06T 7/70* (2017.01)

(58) Field of Classification Search
CPC ................................ G06T 19/006; G06T 7/70
See application file for complete search history.

(56) References Cited

U.S. PATENT DOCUMENTS

2011/0234879 A1* 9/2011 Kashitani ............... G06F 3/012
                                                          348/333.02
2019/0311471 A1* 10/2019 Kurabayashi ......... G06T 7/0002

FOREIGN PATENT DOCUMENTS

| CN | 102200881 A | 9/2011 |
| CN | 107665508 A | 2/2018 |

(Continued)

OTHER PUBLICATIONS

Gao Qing Hong et al, "An Improved Augmented Reality Registration Method Based on Visual SLAM", Oct. 12, 2017 (Oct. 12, 2017), SAT 2015 18th International Conference, Austin, TX, USA, Sep. 24-27, 2015; [Lecture Notes in Computer Science; Lect.Notes Computer], Springer, Berlin, Heidelberg, pp. 11-19.

(Continued)

*Primary Examiner* — Shivang I Patel
(74) *Attorney, Agent, or Firm* — CHIP LAW GROUP

(57) ABSTRACT

Provided is an information processing device that includes a first self-position estimation unit that performs a first self-position estimation on the basis of an environment image whose subjects are surroundings of the information processing device. The information processing device further includes a second self-position estimation unit that performs a second self-position estimation on the basis of a detection plane detected from the environment image and object information generated in advance and related to a shielding AR object having a planar shape to correct a display position of a non-shielding AR object according to a result of the first self-position estimation on the basis of a result of the second self-position estimation.

9 Claims, 9 Drawing Sheets

(56) References Cited

FOREIGN PATENT DOCUMENTS

| | | | |
|---|---|---|---|
| CN | 109155082 | A | 1/2019 |
| CN | 110383343 | A | 10/2019 |
| EP | 3467790 | A1 | 4/2019 |
| JP | 2011-203823 | A | 10/2011 |
| JP | 2018-106262 | A | 7/2018 |
| JP | 2018-169698 | A | 11/2018 |
| JP | 6520119 | B2 | 5/2019 |
| KR | 10-2019-0089957 | A | 7/2019 |
| WO | 2017/203774 | A1 | 11/2017 |
| WO | 2018/116790 | A1 | 6/2018 |

OTHER PUBLICATIONS

Renato F Salas-Moreno et al, "Dense Planar SLAM", Jan. 1, 2014 (Jan. 1, 2014), XP055140024, Imperial College London, DOI: 10.1109/ISMAR.2014.6948422.

Ruibin Guo et al, "RGB-D SLAM Using Point-Plane Constraints for Indoor Environments", Sensors, vol. 19, No. 12, Jun. 17, 2019 (Jun. 17, 2019), pp. 1-16.

International Search Report and Written Opinion of PCT Application No. PCT/JP2020/035751, issued on Dec. 15, 2020, 08 pages of ISRWO.

\* cited by examiner

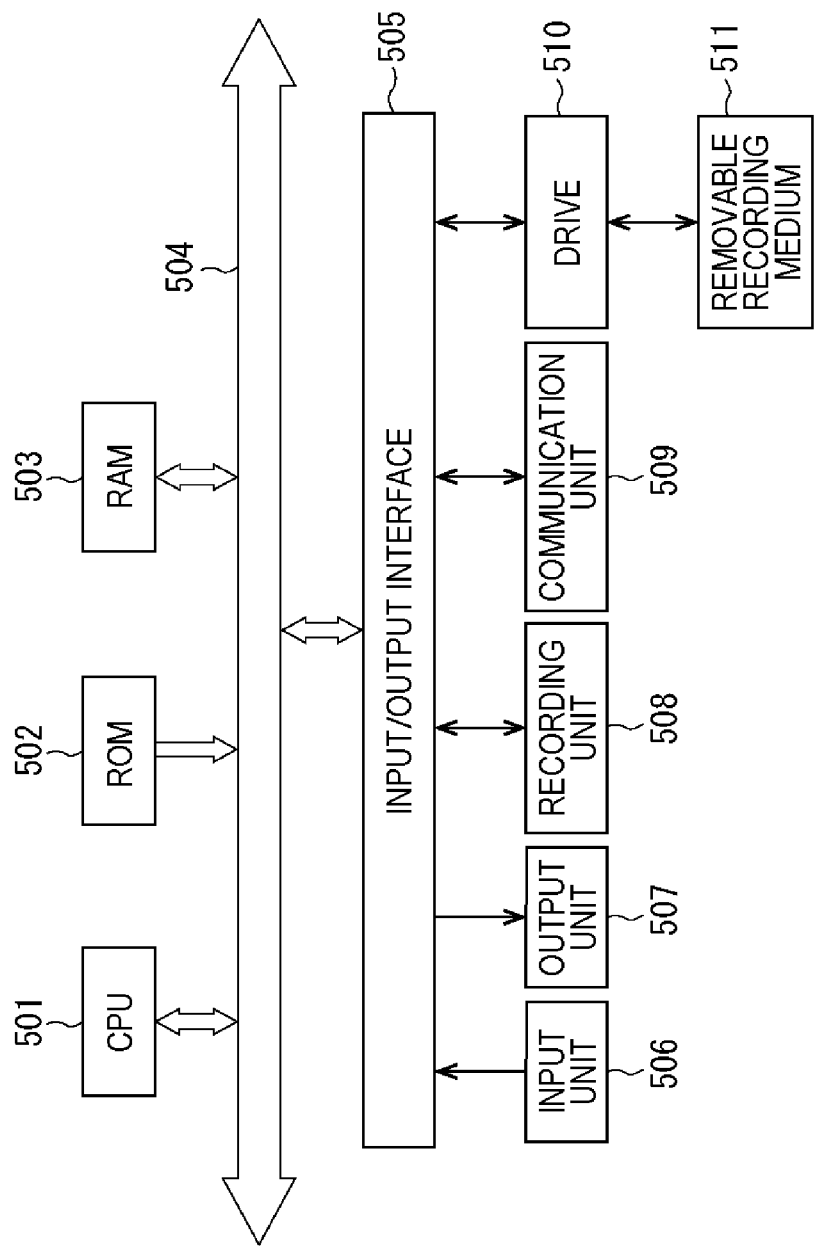

INFORMATION PROCESSING DEVICE AND METHOD FOR DISPLAYING AR OBJECT AT ACCURATE POSITION

CROSS REFERENCE TO RELATED APPLICATIONS

This application is a U.S. National Phase of International Patent Application No. PCT/JP2020/035751 filed on Sep. 23, 2020, which claims priority benefit of Japanese Patent Application No. JP 2019-183024 filed in the Japan Patent Office on Oct. 3, 2019. Each of the above-referenced applications is hereby incorporated herein by reference in its entirety.

TECHNICAL FIELD

The present technology relates to an information processing device, method, and program, and more particularly, to an information processing device, method, and program capable of more easily displaying an AR object at an accurate position.

BACKGROUND ART

Conventionally, an augmented reality (AR) technology is known in which an AR object, which is a virtual image not existing in a real space, is displayed on a transmissive display device.

As a technology for implementing such AR, there is self-position estimation for estimating the self-position and orientation on the basis of an environment image whose subjects are the surroundings of the self-position.

For example, as a method of self-position estimation, there is a method of holding feature point information called MapDB created in advance in a device and performing self-position estimation using the MapDB. In this method, the MapDB is generated in advance on the basis of an environment image captured in advance.

Furthermore, as another method of self-position estimation, a method has also been proposed in which mesh, which is information regarding the surrounding space, is dynamically constructed from an environment image, and self-position estimation is performed on the basis of the mesh. In this method, an AR object is arranged at a relative position with respect to the mesh having an absolute positional relationship with the surrounding space, so that display of the AR object at an absolute position is implemented.

In addition, as a method of self-position estimation, a method has also been proposed in which self-position estimation is performed by use of a QR code (registered trademark), an AR marker, a color code, a character string, or the like (see, for example, Patent Document 1).

Moreover, as a technology related to the display of an AR object, for example, a technology has also been proposed in which a plane is detected and the AR object is arranged with a size, position, and depth appropriate for the plane portion (see, for example, Patent Document 2).

CITATION LIST

Patent Document

Patent Document 1: Japanese Patent Application Laid-Open No. 2018-169698
Patent Document 2: Japanese Patent No. 6520119

SUMMARY OF THE INVENTION

Problems to be Solved by the Invention

However, in the above-described technologies, it is difficult to more easily display an AR object at an accurate position.

For example, in the self-position estimation using MapDB or the self-position estimation based on mesh, in a case where there are no feature points on a captured environment image, the self-position and orientation are corrected on the basis of a sensing result by an inertial measurement unit (IMU). In other words, the self-position estimation is performed on the basis of the sensing result. However, the correction based on such a sensing result is less accurate than the self-position estimation based on MapDB or mesh, and an error occurs in the resulting self-position and orientation.

Therefore, for example, in a case where a user wearing an AR device continues to look in a direction in which there are no feature points and the self-position and orientation are continuously corrected on the basis of the sensing result of the IMU, the error is accumulated with time. As a result, the AR object is not correctly displayed at the position assumed in advance.

Furthermore, for example, in the technology described in Patent Document 1, since it is necessary to arrange a QR code or an AR marker at a specific position in a space, not only advance preparation or the like is complicated, but also versatility is deteriorated. Moreover, in the technology described in Patent Document 2, an AR object can be arranged on a dynamically detected plane, but the AR object cannot be arranged at a predetermined absolute position.

The present technology has been made in view of such a situation, and makes it possible to more easily display an AR object at an accurate position.

Solutions to Problems

An information processing device according to one aspect of the present technology includes: a first self-position estimation unit that performs a first self-position estimation on the basis of an environment image whose subjects are surroundings of the information processing device; and a second self-position estimation unit that performs a second self-position estimation on the basis of a detection plane detected from the environment image and object information generated in advance and related to a shielding AR object having a planar shape to correct a display position of a non-shielding AR object according to a result of the first self-position estimation on the basis of a result of the second self-position estimation.

An information processing method or program according to one aspect of the present technology includes steps of: performing a first self-position estimation on the basis of an environment image whose subjects are surroundings of an information processing device; and performing a second self-position estimation on the basis of a detection plane detected from the environment image and object information generated in advance and related to a shielding AR object having a planar shape to correct a display position of a non-shielding AR object according to a result of the first self-position estimation on the basis of a result of the second self-position estimation.

According to one aspect of the present technology, a first self-position estimation is performed on the basis of an environment image whose subjects are surroundings of an information processing device, and a second self-position estimation is performed on the basis of a detection plane detected from the environment image and object information generated in advance and related to a shielding AR object having a planar shape to correct a display position of a non-shielding AR object according to a result of the first self-position estimation on the basis of a result of the second self-position estimation.

BRIEF DESCRIPTION OF DRAWINGS

FIG. 9 is a diagram illustrating a configuration example of a computer.

MODE FOR CARRYING OUT THE INVENTION

Hereinafter, embodiments to which the present technology is applied will be described with reference to the drawings.

First Embodiment

Configuration Example of Information Processing Device

The present technology makes it possible to more easily display an AR object at an accurate position by using plane detection.

That is, in the present technology, a first self-position estimation is performed in which feature points are extracted from an environment image and the self-position and orientation are estimated, and the AR object, which is a virtual image not existing in a real space, is displayed on the basis of the estimation result.

Furthermore, at the same time, a second self-position estimation is appropriately performed in which a plane is detected from the environment image and the self-position and orientation are estimated, and the display position of the AR object is corrected (updated) on the basis of the estimation result.

By such processing, the present technology makes it possible to more easily display the AR object at the accurate position.

The method of the first self-position estimation may be any method. For example, as the first self-position estimation, self-position estimation is performed by use of MapDB generated in advance, that is, by use of feature point information of environment images captured in advance.

Furthermore, in the second self-position estimation, self-position estimation is performed on the basis of preset plane information regarding planes constituting the real world and a plane dynamically detected from an environment image captured at the time of execution of an application.

In this case, even in a situation where no feature points are detected from the environment image by the first self-position estimation, the AR object can be more accurately displayed at an absolute position in the space on the basis of the estimation result of the second self-position estimation. In particular, in this example, it is possible to take advantage of the fact that the AR object can be arranged at an absolute position in the stage of creating the application.

Hereinafter, the present technology will be described in more detail.

Figure 1:
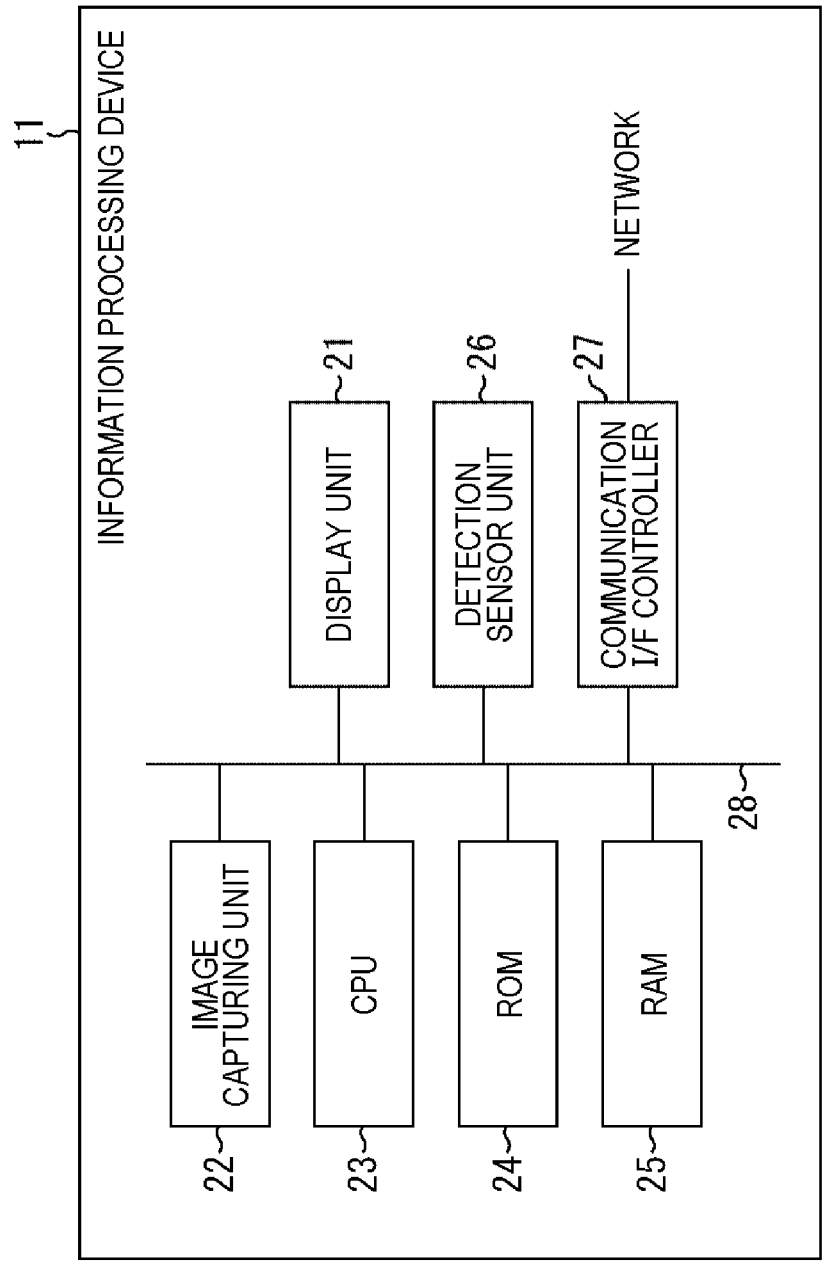
FIG. 1 is a diagram illustrating a configuration example of an information processing device.

FIG. 1 is a diagram illustrating a configuration example of hardware of an information processing device to which the present technology is applied.

An information processing device 11 illustrated in FIG. 1 is, for example, an AR device including a head mounted display, a smartphone, or the like that implements a predetermined AR application, and is worn on the head of a user.

The information processing device 11 includes a display unit 21, an image capturing unit 22, a central processing unit (CPU) 23, a read only memory (ROM) 24, a random access memory (RAM) 25, a detection sensor unit 26, and a communication interface (I/F) controller 27, and the display unit 21 to the communication I/F controller 27 are mutually connected by a bus 28.

The display unit 21 includes a translucent transmissive display provided for each of the left and right eyes of the user, and displays an image of AR objects or the like supplied from the CPU 23.

Therefore, for example, the user wearing the information processing device 11 sees the AR objects or the like displayed on the display unit 21, which are superimposed on an image of a real space seen through the display unit 21. Note that the display unit 21 may be an optically transmissive display, and in such a case, the AR objects or the like are superimposed on an image of surrounding subjects captured by the image capturing unit 22 and displayed on the display unit 21.

The image capturing unit 22 includes, for example, a stereo camera or the like, and captures an environment image whose subjects are the surroundings of the information processing device 11 (user), and supplies the environment image to the CPU 23 via the bus 28.

Here, the environment image captured by the image capturing unit 22 is, for example, a stereo moving image or the like including an image captured with a position near the right eye of the user set as a viewpoint position and an image captured with a position near the left eye of the user set as a viewpoint position. Note that the environment image may be a still image.

The CPU 23 functions as a control unit that controls the entire operation of the information processing device 11. For example, the CPU 23 executes a predetermined AR application, and during the execution, performs self-position estimation on the basis of the environment image and causes the display unit 21 to display the AR objects on the basis of a result of the self-position estimation.

The ROM 24 records various programs and data for implementing the AR application or the like, and supplies the recorded programs and data to the CPU 23 as appropriate. The RAM 25 temporarily holds various data supplied from the CPU 23 and supplies the held data to the CPU 23.

The detection sensor unit 26 includes, for example, an acceleration sensor, a gyro sensor, an IMU obtained by combining the acceleration sensor and the gyro sensor, or the like, detects a motion of the information processing device 11, that is, a motion of the user wearing the information processing device 11, and outputs the detection result as IMU information.

The communication I/F controller 27 communicates with an external device via a network. That is, for example, the communication I/F controller 27 transmits information supplied from the CPU 23 to an external device, and receives information transmitted from an external device to supply the information to the CPU 23.

Note that an example in which the display unit 21 to the communication I/F controller 27 are provided in one device will be described here, but some of these components may be provided in another device.

For example, in a case where the information processing device 11 includes a personal computer or the like, the display unit 21 and the image capturing unit 22 can be provided in a wearable device worn on the head of the user, which is different from the information processing device 11.

Configuration Example of Control Unit

Furthermore, in the case of implementing the AR application by executing a program read from the ROM 24, the CPU 23 functions as the control unit that controls each unit of the information processing device 11.

A functional configuration of the control unit implemented by the CPU 23 as described above is as illustrated in FIG. 2, for example.

Figure 2:
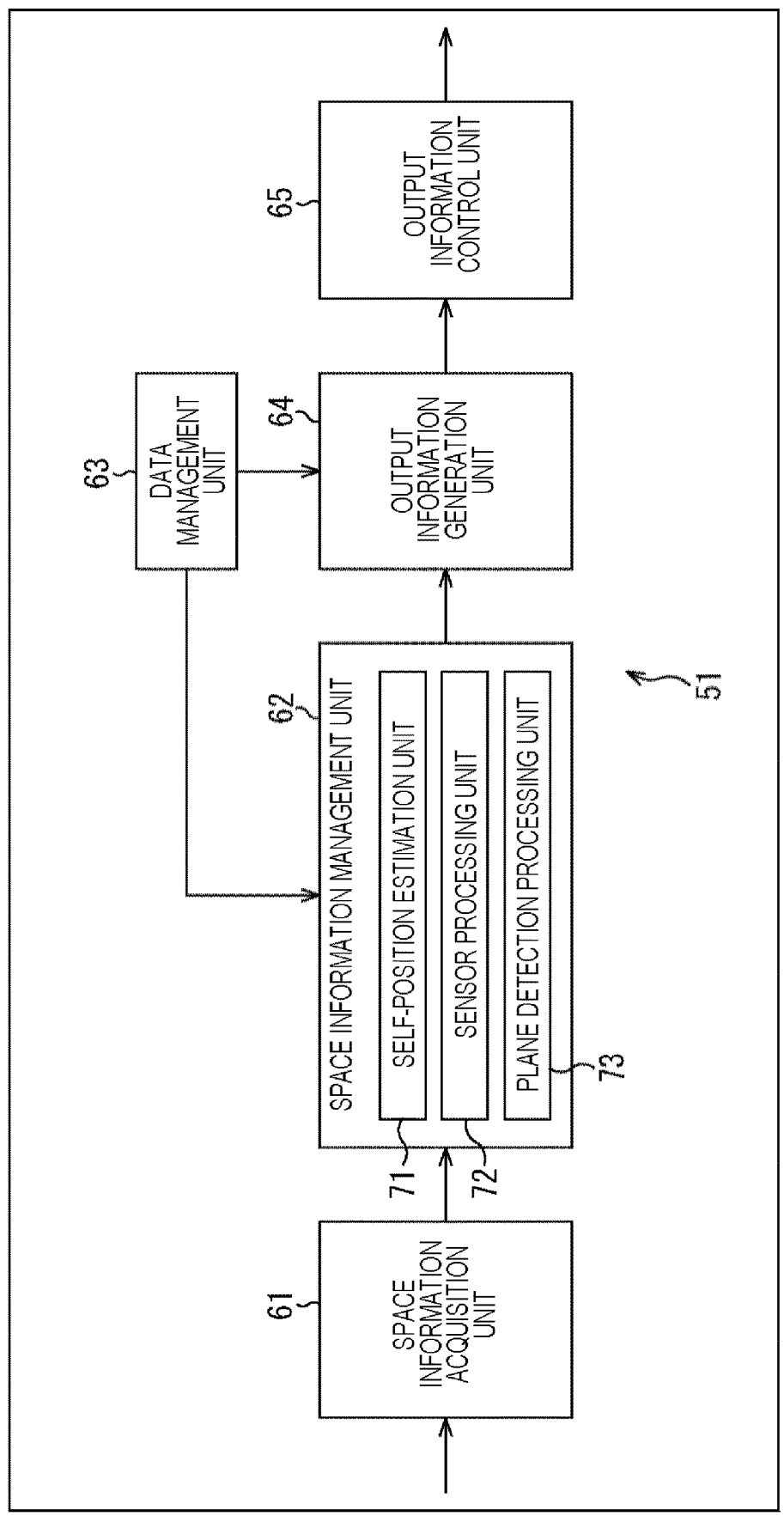
FIG. 2 is a diagram illustrating a functional configuration example of a control unit.

A control unit 51 illustrated in FIG. 2 includes a space information acquisition unit 61, a space information management unit 62, a data management unit 63, an output information generation unit 64, and an output information control unit 65.

The space information acquisition unit 61 acquires the environment image from the image capturing unit 22 and acquires the IMU information from the detection sensor unit 26 to generate space information including the environment image and the IMU information, and supplies the space information to the space information management unit 62.

The space information management unit 62 performs self-position estimation on the basis of the space information supplied from the space information acquisition unit 61 and MapDB and object information supplied from the data management unit 63, and supplies position/orientation information obtained as a result of the self-position estimation to the output information generation unit 64.

The position/orientation information output from the space information management unit 62 is information indicating the current position and orientation of the information processing device 11, that is, the self-position and orientation of the user wearing the information processing device 11.

Note that the MapDB is information regarding the real space in which the AR application is executed (hereinafter, the real space will also be referred to as a target space).

In particular, here, the MapDB is map information including environment images that are captured in advance and whose subject is the target space and image capturing position/orientation information indicating the position and orientation of a camera in the target space at the time of capturing the environment images.

Furthermore, the object information is information indicating the AR objects displayed on the display unit 21 during the execution of the AR application, that is, image information of the AR objects, and the positions of the AR objects in the target space, that is, the display positions of the AR objects.

The space information management unit 62 includes a self-position estimation unit 71, a sensor processing unit 72, and a plane detection processing unit 73.

The self-position estimation unit 71 performs self-position estimation on the basis of the space information, particularly the environment image included in the space information, and the MapDB supplied from the data management unit 63, and generates the position/orientation information indicating the estimation result.

The sensor processing unit 72 estimates the motion of the information processing device 11, that is, the change in the position and orientation on the basis of the space information, particularly the IMU information or the like included in the space information, and updates (corrects) the position/orientation information on the basis of the estimation result. Therefore, it can be said that the estimation of the motion based on the IMU information or the like performed by the sensor processing unit 72 is also self-position estimation.

The plane detection processing unit 73 detects a plane from the environment image included in the space information, and updates (corrects) the position/orientation information on the basis of a result of the plane detection, the object information supplied from the data management unit 63, and the position/orientation information.

It can be said that such processing of updating the position/orientation information performed in the plane detection processing unit 73 is self-position estimation that detects a plane from the environment image and estimates the self-position and orientation in the target space.

The data management unit 63 appropriately holds MapDB and object information read from the ROM 24, and supplies the held MapDB and object information to the space information management unit 62 and the output information generation unit 64.

The output information generation unit 64 generates presented video information for displaying a video including the AR objects or the like to be presented to the user on the basis of the position/orientation information supplied from the space information management unit 62 and the object information supplied from the data management unit 63. The output information generation unit 64 supplies the generated presented video information to the output information control unit 65.

The output information control unit 65 converts the presented video information supplied from the output information generation unit 64 into information in a format displayable on each of the right-eye display and the left-eye display of the display unit 21, and supplies the obtained presented video information to the display unit 21 via the bus 28 to cause the display unit 21 to display the presented video information.

<About Generation of MapDB and Object Information and Self-Position Estimation>

Next, generation of MapDB and object information and self-position estimation will be described.

First, generation of MapDB and object information will be described.

Since MapDB is used for self-position estimation by the self-position estimation unit 71, the MapDB is generated in advance and recorded in the ROM 24 or the like, for example, when an AR application is created.

Specifically, for example, in a case where an AR application assumed to be executed in a target space in the real world is created, environment images are captured by a stereo camera at a plurality of positions in the target space.

Furthermore, for each of the plurality of positions, an environment image obtained by image capturing is set as a key frame, and image capturing position/orientation information indicating the position and orientation of the stereo camera is generated from IMU information or the like at the time of capturing the key frame.

Information including the key frame and image capturing position/orientation information for each of the plurality of image capturing positions obtained in this manner is then defined as MapDB.

Note that, for each key frame, feature points on the key frame and a feature amount at each feature point may be obtained in advance, and MapDB may be generated that includes the key frames, the image capturing position/orientation information, information indicating the feature points, and the feature amounts.

Furthermore, information indicating the shape of a three-dimensional target space, which is called environment mesh for AR application development, is generated on the basis of each key frame, and object information is generated on the basis of the environment mesh.

Here, the object information is information indicating image information of AR objects displayed on a video (image) based on presented video information and the display positions of the AR objects, and the AR objects indicated by the object information have two types.

That is, the AR objects include a shielding object displayed so as to be invisible to a user on the video based on the presented video information, and a non-shielding object displayed so as to be visible to the user on the video based on the presented video information.

The shielding object is an object that is displayed in a specific color invisible to the user when displayed on the transmissive display unit 21, such as black, for example, and is used for occlusion processing at the time of actual execution of the AR application. Furthermore, the shielding object is also used for determining collision with a portion having a planar shape, such as a floor in the target space, which corresponds to the shielding object.

For example, in this example, portions each having a planar shape (plane portions), such as a floor and a wall existing in the target space, are set as shielding objects, and information regarding the shielding objects in the object information is generated on the basis of the environment mesh.

On the other hand, the non-shielding object is an AR object other than the shielding objects, which is displayed in a color visible to the user on the video based on the presented video information.

In particular, in this example, the non-shielding object is, for example, a virtual image having a shape that is not a planar shape (non-planar shape) and not existing in the actual target space. Therefore, the image of the non-shielding object is not generated from the environment mesh, and is appropriately generated by an AR application developer or the like.

Furthermore, the occlusion processing based on the shielding objects is, for example, processing for implementing natural video display by displaying the shielding objects in a color invisible to the user, such as black, on the video.

For example, it is assumed that, when the non-shielding object is displayed on the video at the time of execution of the AR application, a wall in the target space, which corresponds to a shielding object, exists on the near side as seen from the viewpoint position of the user, that is, on the user side, in a partial region of the non-shielding object (hereinafter, referred to as an occlusion region).

In this case, for example, if only the non-shielding object is displayed, the occlusion region originally on the far side of the wall is displayed as if the occlusion region is on the near side of the wall, and the display is unnatural.

On the other hand, natural video display is implemented if processing of displaying not only the non-shielding object but also the shielding object is performed as occlusion processing on the basis of the spatial positional relationship between the shielding object and the non-shielding object.

That is, in this case, since the shielding object is displayed on the near side of the occlusion region of the non-shielding object on the video, it seems to the user that nothing is displayed in the occlusion region. Therefore, in the occlusion region, the user can see the wall actually existing in the target space. That is, it seems to the user that the partial region of the non-shielding object (occlusion region) is hidden by the wall.

Note that, here, an example of displaying the shielding object in a color invisible to the user has been described as occlusion processing, but processing of cutting out a part of the non-shielding object may be performed by use of the information regarding the shielding objects.

For example, in the occlusion region of the non-shielding object, as described above, it is assumed that the shielding object, that is, the wall in the target space exists on the near side (user side) of the non-shielding object.

In such a case, for example, as occlusion processing, processing is performed in which the occlusion region in the image of the non-shielding object is specified on the basis of the information regarding the shielding objects as object information, a region other than the occlusion region is cut out, and the cutout region is used for generation of presented video information. Even such processing makes it possible to implement video presentation in which the partial region of the non-shielding object is hidden by the wall.

The information regarding the shielding objects in the object information as described above is generated on the basis of the environment mesh obtained from the key frames.

For example, polygon mesh data imitating a target space in the real world is generated on the basis of the environment mesh, and mesh portions corresponding to the shielding objects in the polygon mesh data are set as shielding mesh.

The polygon mesh data is data representing the target space by one or a plurality of meshes each having a planar shape, and one mesh portion indicates the absolute position and size of one region having a planar shape (plane), which exists in the target space.

The object information includes the shielding mesh corresponding to the shielding objects generated in this manner and information indicating a display color and the like of the shielding objects as information regarding the shielding objects.

Furthermore, the shielding mesh is information indicating the absolute positions and sizes of the shielding objects in the target space, and thus, for example, the AR application developer arranges the non-shielding object at an absolute position in the target space on the basis of the environment mesh and the shielding mesh. The developer then generates, as information regarding the non-shielding object included in the object information, information indicating the arrangement position of the non-shielding object and an image for displaying the non-shielding object, that is, information such as the shape and display color of the non-shielding object.

The object information obtained as described above is managed by the data management unit 63.

Figure 3:
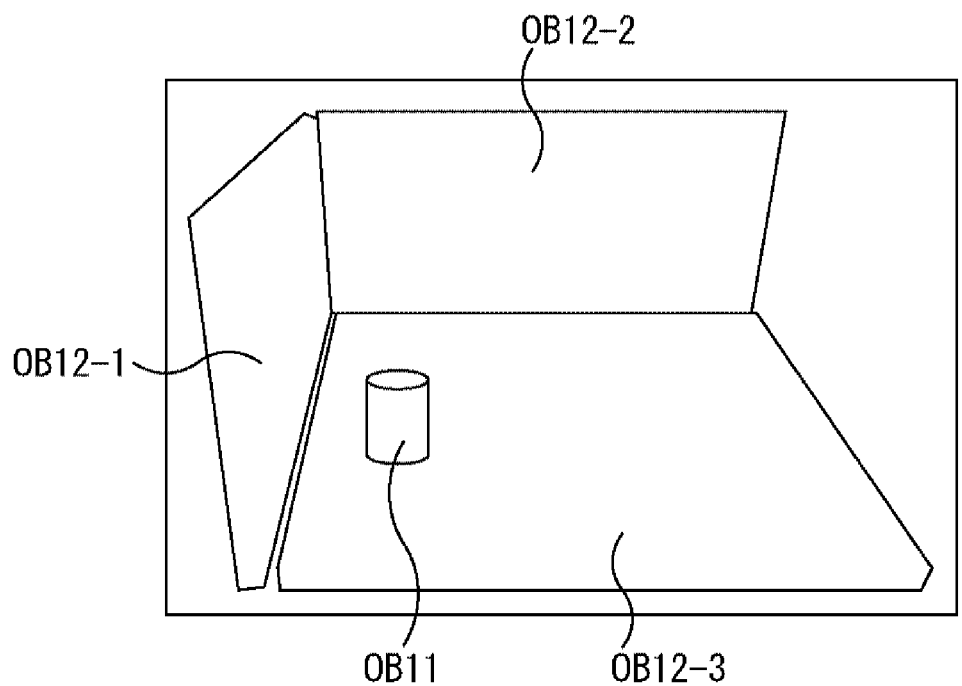
FIG. 3 is a diagram for describing an arrangement example of AR objects.

Furthermore, as such object information, for example, information indicating arrangement of AR objects illustrated in FIG. 3 is obtained.

In the example illustrated in FIG. 3, as the AR objects indicated by the object information, a non-shielding object OB11 and shielding objects OB12-1 to OB12-3 are arranged in a target space.

Here, the non-shielding object OB11 is a virtual image that is presented so as to be visible to a user and does not actually exist in the target space. In particular, in this example, the non-shielding object OB11 is arranged on a floor in the target space.

Furthermore, the shielding objects OB12-1 and OB12-2 correspond to regions of actual walls in the target space.

That is, the shielding objects OB12-1 and OB12-2 are AR objects imitating actual walls.

Similarly, the shielding object OB12-3 corresponds to a region of the actual floor in the target space.

Note that, hereinafter, in a case where it is not necessary to particularly distinguish the shielding objects OB12-1 to OB12-3, the shielding objects OB12-1 to OB12-3 will also be simply referred to as the shielding object OB12.

Next, general self-position estimation based on MapDB performed at the time of execution of an AR application will be described. This self-position estimation processing is also called localization processing.

First, feature points are detected from an actually captured environment image, and feature amounts of the detected feature points are extracted. Hereinafter, the environment image captured in real time at the time of execution of the AR application will also be referred to as a real-time environment image.

Subsequently, search processing based on the feature points of the real-time environment image is performed on a group of local key frames (environment images) of MapDB. That is, the group of key frames is searched for the key frame most similar to the real-time environment image.

Here, the key frame most similar to the real-time environment image is a key frame having the most similar positional relationship of feature points between the images. However, for example, in a case where the similarity or the like of the positional relationship of the feature points between the real-time environment image and the key frame is equal to or less than a predetermined value and it cannot be said that the positional relationship of the feature points between the images is similar, a search result indicating that there is no most similar key frame may be output.

Hereinafter, the key frame most similar to the real-time environment image obtained in such search processing will also be referred to as a similar key frame.

Since such a similar key frame is an image similar to the real-time environment image, the position and orientation at the time of capturing the real-time environment image should be close to the position and orientation at the time of capturing the similar key frame.

After the similar key frame is obtained, feature amount matching and image matching are performed on the basis of the feature points, the feature amounts, and the image capturing position/orientation information of the similar key frame and the feature points and the feature amounts of the real-time environment image, and the self-position and orientation at the time of capturing the real-time environment image are estimated. In this manner, position/orientation information indicating the self-position and orientation obtained as a result of the estimation is generated.

In the localization processing, in a case where the feature points are detected from the real-time environment image, matching with the similar key frame is performed as described above, and the self-position and orientation in the target space are estimated.

However, depending on the direction in which the user is looking, there is a case where no feature points are detected from the real-time environment image.

In such a case, since the similar key frame cannot be determined, the self-position and orientation of the user are estimated on the basis of IMU information, more specifically, the relative change in the self-position and orientation from the timing at which the position/orientation information was last updated is estimated, and the position/orientation information is updated (corrected) on the basis of the estimation result.

Although it can be said that the estimation of the self-position and orientation based on IMU information is also processing of self-position estimation, the estimation accuracy is not high as compared with the self-position estimation based on MapDB.

Therefore, if the period during which the self-position estimation based on IMU information is continuously performed is longer, an estimation error in the self-position estimation is accumulated accordingly, and correct position/orientation information cannot be obtained. As a result, the display positions of the AR objects deviate, and there is a possibility that the user feels uncomfortable.

Therefore, the information processing device 11 performs processing of estimating the self-position and orientation on the basis of the information regarding the shielding objects included in the object information, that is, information regarding planes in the target space, and appropriately corrects (updates) the position/orientation information.

With this processing, more accurate position/orientation information can be obtained, and as a result, the AR objects can be displayed at more accurate positions.

Specifically, for example, it is assumed that the user wearing the information processing device 11 is looking at a wall corresponding to the shielding object OB12-1 (hereinafter, also referred to as a left wall) from the right side in the target space illustrated in FIG. 3.

Figure 4:
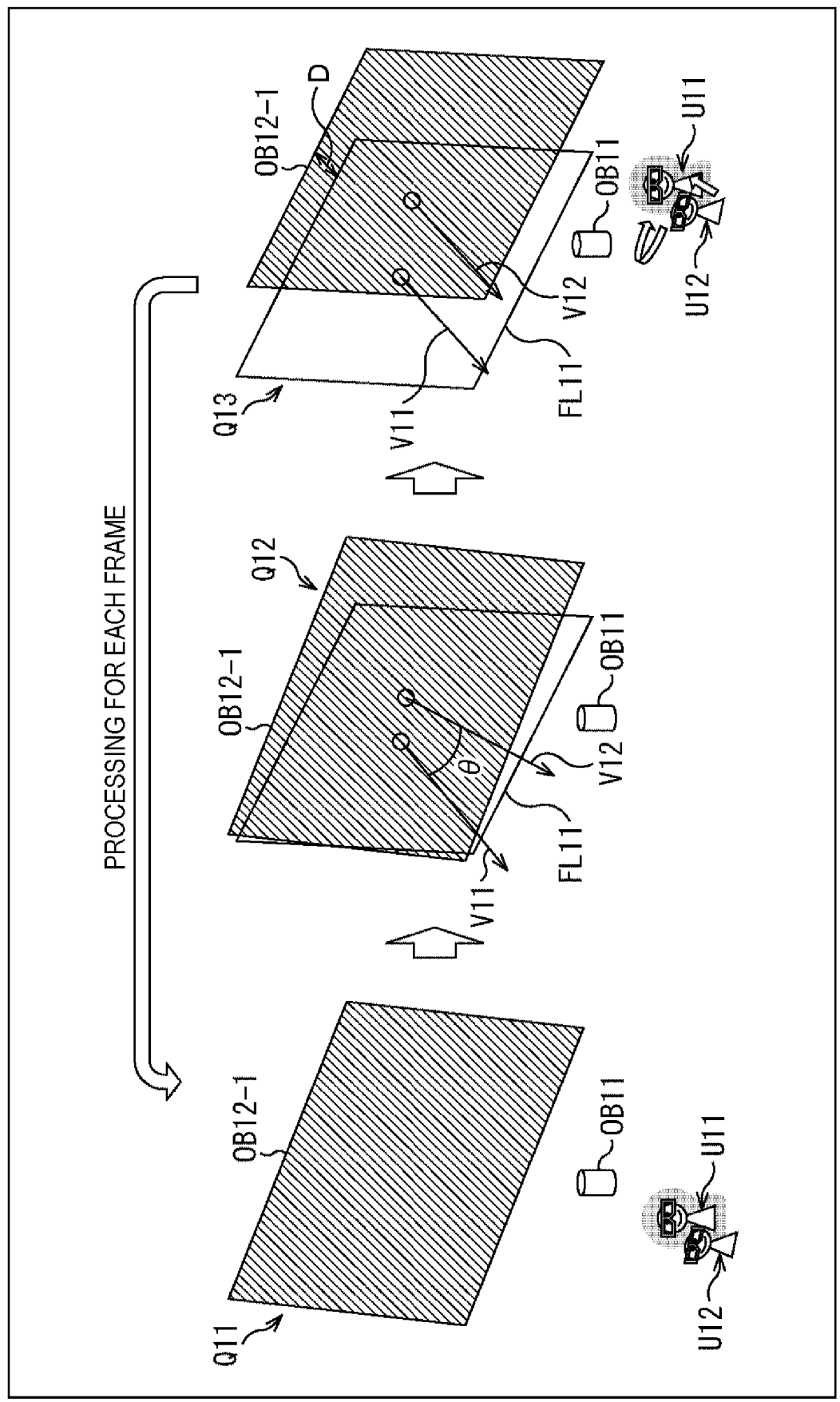
FIG. 4 is a diagram for describing updating of position/orientation information based on plane detection.

In such a case, for example, on the video based on the presented video information, the non-shielding object OB11 is arranged in front of the left wall corresponding to the shielding object OB12-1 as seen from the user, as indicated by an arrow Q11 in FIG. 4. Note that, in FIG. 4, parts corresponding to those in FIG. 3 are denoted by the same reference signs, and the description thereof will be omitted as appropriate.

In this example, when the user faces the direction of the left wall, no feature points are detected from the real-time environment image, but the region of the left wall corresponding to the shielding object OB12-1 is detected as a plane.

In such a case, since no feature points can be detected from the real-time environment image and the self-position estimation using MapDB cannot be performed, an error may occur in the self-position and orientation indicated by the position/orientation information.

Here, for example, although the user is actually at a position U11, the self-position of the user indicated by the position/orientation information is a position U12, and as a result, the display position of the non-shielding object OB11 also deviates.

The plane detection processing unit 73 determines one of the shielding objects OB12 indicated by the object information, to which the plane detected from the real-time environment image corresponds (corresponds), and corrects the position/orientation information, that is, corrects the self-position and orientation.

That is, for example, as indicated by an arrow Q12, when a plane FL11 is detected from the real-time environment image, a normal vector V11 of the plane FL11 is obtained.

Then, one of all the shielding objects OB12 that has the smallest angle between the obtained normal vector V11 and the normal vector of the shielding object OB12 is determined to be the shielding object OB12 corresponding to the plane FL11.

In this example, since the angle between the normal vector V11 and a normal vector V12 of the shielding object OB12-1 is the smallest among the angles between the normal vector V11 and the normal vectors of all the shielding objects OB12, the plane FL11 is determined to correspond to the shielding object OB12-1.

If there is no deviation (error) in the self-position and orientation indicated by the position/orientation information, the plane FL11 and the shielding object OB12-1 associated in this manner should be at the same position. In other words, the deviation in position and orientation between the plane FL11 and the shielding object OB12-1 indicates the error in the position/orientation information.

Therefore, if the position/orientation information is corrected by the amount of the error, more accurate position/orientation information can be obtained, and as a result, the non-shielding object OB11 can be displayed at a more accurate position.

Therefore, for example, the plane detection processing unit 73 first obtains a rotation amount θ of the shielding object OB12-1 with respect to the plane FL11. Specifically, the angle between the normal vector V11 and the normal vector V12 is obtained as the rotation amount θ.

The orientation indicated by the position/orientation information is then corrected by the rotation amount θ. As a result, the shielding object OB12-1 is rotated by the rotation amount θ as indicated by an arrow Q13, and the plane FL11 and the shielding object OB12-1 are arranged in parallel. That is, the normal vector V11 and the normal vector V12 are in parallel.

Next, the distance in the vertical direction (normal direction) between the shielding object OB12-1 having a planar shape and the plane FL11, which are arranged in parallel, is obtained as a parallel movement distance D, and the self-position indicated by the position/orientation information is corrected by the parallel movement distance D.

The position/orientation information is corrected on the basis of the rotation amount θ and the parallel movement distance D in this manner, so that the shielding object OB12-1 and the plane FL11 overlap with each other, and the position U12 of the user is also corrected to the original correct position U11. As a result, the non-shielding object OB11 is also displayed at a more accurate position.

In other words, the plane detection processing unit 73 corrects the display position of the non-shielding object OB11 by correcting the position/orientation information on the basis of the rotation amount θ and the parallel movement distance D.

Performing the above processing, for example, for each frame of the real-time environment image makes it possible to correct the position/orientation information for each frame and display all the AR objects such as the non-shielding object and the shielding objects at more accurate display positions. In other words, all the AR objects can be displayed at the correct positions on the detected plane.

In this case, for example, even in a case where the user faces an arbitrary direction in the target space, that is, an arbitrary three-dimensional direction, the position/orientation information can be corrected by use of the plane detection.

Note that the plane detection and the correction of the position/orientation information by the plane detection processing unit 73 may be performed not only for each frame of the real-time environment image but also at any timing.

For example, the plane detection processing unit 73 may perform the plane detection and the correction of the position/orientation information after the self-position estimation based on MapDB is performed and before the self-position estimation based on MapDB is performed next time.

Furthermore, the plane detection and the correction of the position/orientation information may be performed only in a case where no feature points are detected from the real-time environment image, or the plane detection and the correction of the position/orientation information may be always performed regardless of whether or not the feature points are detected.

<Description of Display Control Processing>

Next, the operation of the information processing device 11 will be described.

That is, display control processing performed by the information processing device 11 will be described below with reference to the flowchart of FIG. 5. Note that this display control processing is started when the AR application is executed.

In step S11, the output information control unit 65 supplies the presented video information to the display unit 21, thereby causing the display unit 21 to display the video based on the presented video information, that is, the AR objects.

Note that, here, it is assumed that the feature points, that is, the key frames corresponding to the real-time environment image are detected from the real-time environment image at the start of display control processing, and the self-position estimation based on MapDB is performed.

In step S11, the AR objects are displayed on the basis of the presented video information generated on the basis of the position/orientation information obtained by such self-position estimation based on MapDB.

Furthermore, when the display control processing is started, the space information acquisition unit 61 sequentially acquires the real-time environment image and the IMU information from the image capturing unit 22 and the detection sensor unit 26, generates the space information, and supplies the space information to the space information management unit 62. Here, it is assumed that the space information is generated for each frame of the real-time environment image and supplied to the space information management unit 62.

In step S12, the self-position estimation unit 71 detects the feature points from the real-time environment image included in the space information on the basis of the space information supplied from the space information acquisition unit 61, and also extracts the feature amounts of the feature points detected from the real-time environment image.

In step S13, the self-position estimation unit 71 detects the feature points from the key frames included in the MapDB supplied from the data management unit 63, and also extracts the feature amounts of the feature points detected from the key frames.

In step S14, the self-position estimation unit 71 searches the plurality of key frames included in the MapDB for the similar key frame on the basis of the detection results of the feature points in steps S12 and S13.

In step S15, the self-position estimation unit 71 determines whether or not the similar key frame has been obtained as a result of the search in step S14.

Here, for example, in a case where no feature points are detected from the real-time environment image in step S12, or in a case where there is no key frame having a positional relationship of the feature points similar to that of the real-time environment image, it is determined that the similar key frame has not been obtained.

In a case where it is determined in step S15 that the similar key frame has been obtained, in step S16, the self-position estimation unit 71 performs self-position estimation based on the similar key frame, and updates the position/orientation information obtained in past processing and held at present on the basis of a result of the self-position estimation. That is, new position/orientation information is generated.

For example, in step S16, the self-position estimation unit 71 performs self-position estimation on the basis of the similar key frame included in the MapDB, the feature points and the feature amounts of the similar key frame, image capturing position information of the similar key frame, and the feature points and the feature amounts of the real-time environment image.

At this time, for example, feature amount matching and image matching are performed, and the self-position and orientation of the user (the information processing device 11) at the time of capturing the real-time environment image are estimated.

After the self-position estimation based on the similar key frame, that is, the self-position estimation based on MapDB is performed in this manner, the processing proceeds to step S18.

On the other hand, in a case where it is determined in step S15 that the similar key frame has not been obtained, in step S17, the sensor processing unit 72 updates the position/orientation information obtained in the past processing and held in the self-position estimation unit 71 on the basis of the space information.

That is, in a case where the self-position estimation based on MapDB cannot be performed, the position/orientation information is corrected (updated) on the basis of the space information.

For example, in step S17, the sensor processing unit 72 estimates the motion of the information processing device 11 on the basis of the IMU information included in the space information, and updates the position/orientation information on the basis of the estimation result.

After the position/orientation information is updated in this manner, the processing proceeds to step S18.

When the processing of step S16 or step S17 is performed, in step S18, the plane detection processing unit 73 performs plane detection processing on the basis of the space information supplied from the space information acquisition unit 61, and detects a plane from the real-time environment image.

In the plane detection processing, for example, the plane detection processing unit 73 generates a distance image indicating the distance to a subject on the basis of the real-time environment image, which is a stereo moving image, and detects a plane on the real-time environment image by performing three-dimensional Hough transformation on the distance image.

In addition, for example, the method of detecting a plane may be any method such as detecting a plane from the real-time environment image on the basis of the frequency components of the real-time environment image in the vertical direction and the horizontal direction. Furthermore, in the following description, the plane detected in step S18 will also be referred to as a detection plane.

In step S19, the plane detection processing unit 73 determines whether or not a plane has been detected by the plane detection processing of step S18.

In a case where it is determined in step S19 that no plane has been detected, the position/orientation information cannot be corrected on the basis of the plane detection, and thus, the processing then proceeds to step S24.

On the other hand, in a case where it is determined in step S19 that a plane has been detected, thereafter, the processing proceeds to step S20.

In step S20, the plane detection processing unit 73 specifies the shielding object corresponding to the detection plane, that is, the shielding mesh on the basis of the detection result of the plane detection, the object information supplied from the data management unit 63, and the position/orientation information.

That is, as described with reference to FIG. 4, the plane detection processing unit 73 obtains the angle between the normal vector of the detection plane and the normal vector of each shielding object indicated by the object information, and determines that the shielding object having the smallest angle corresponds to the detection plane.

In step S21, the plane detection processing unit 73 calculates the rotation amount θ described with reference to FIG. 4 on the basis of the angle between the normal vector of the detection plane and the normal vector of the shielding object corresponding to the detection plane.

In step S22, the plane detection processing unit 73 calculates the distance between the detection plane and the shielding object rotated on the basis of the rotation amount θ as the parallel movement distance D on the basis of the detection result of the plane detection, the object information, the position/orientation information, and the rotation amount θ.

In step S23, the plane detection processing unit 73 updates the position/orientation information updated in step S16 or step S17 and held in the self-position estimation unit 71 on the basis of the rotation amount θ and the parallel movement distance D obtained in steps S21 and S22.

Note that, here, an example will be described in which both the self-position and orientation indicated by the position/orientation information are updated (corrected) on the basis of the rotation amount θ and the parallel movement distance D, but only one of the self-position and orientation may be updated.

In a case where the processing of step S23 is performed or it is determined that no plane has been detected in step S19, the output information control unit 65 updates the display of the AR objects in step S24.

That is, the space information management unit 62 outputs the position/orientation information held in the self-position estimation unit 71 to the output information generation unit 64.

For example, in a case where the processing of step S23 is performed, the position/orientation information obtained in the processing of step S23 is output to the output information generation unit 64, and in a case where the processing of step S23 is not performed, the position/orientation information obtained in step S16 or step S17 is output to the output information generation unit 64.

The output information generation unit 64 generates the presented video information on the basis of the position/orientation information supplied from the space information management unit 62 and the object information supplied from the data management unit 63, and supplies the presented video information to the output information control unit 65. Since the presented video information generated in this manner is generated on the basis of the latest position/orientation information after update, the video based on the presented video information is a video in which the display positions of the AR objects are updated.

The output information control unit 65 converts the presented video information supplied from the output information generation unit 64 into information in a format displayable on the display unit 21, and supplies the converted presented video information to the display unit 21 to cause the display unit 21 to display the video. As a result, the display positions of the AR objects on the video are updated.

After the display of the AR objects is updated in this manner, the processing returns to step S12, and the above-described processing is repeatedly performed until the AR application is terminated. That is, the above-described processing is performed on the next frame of the real-time environment image.

As described above, the information processing device 11 performs plane detection and updates the position/orientation information on the basis of the detection result.

In this manner, the AR objects can be displayed at more accurate positions by simple processing of performing plane detection and the like. That is, the AR objects can be more easily displayed at accurate positions.

Furthermore, the position/orientation information is updated on the basis of the result of the plane detection processing while self-position estimation is performed on the basis of MapDB, so that, for example, it is possible to reduce the frequency of updating the position/orientation information by the self-position estimation based on MapDB while the accuracy of the position/orientation information is maintained. As a result, for example, the data amount of MapDB, that is, the number of key frames can be reduced.

Note that, here, the self-position estimation based on MapDB generated in advance has been described as an example of self-position estimation by the self-position estimation unit 71. However, the present invention is not limited thereto, and any method may be used as a method of self-position estimation for generating the position/orientation information on the basis of the space information.

For example, as a method of self-position estimation by the self-position estimation unit 71, a method may be adopted in which spatial mesh is dynamically generated and updated from a real-time environment image and the self-position and orientation are estimated on the basis of the spatial mesh. In such a case, the position/orientation information obtained as a result of the self-position estimation is updated (corrected) on the basis of a plane detected from the real-time environment image and object information.

Second Embodiment

<Description of Display Control Processing>

Meanwhile, in the first embodiment, an example has been described in which, in a case where a plane is detected from a real-time environment image, position/orientation information is updated unconditionally on the basis of the detection result of the plane.

Figure 6:
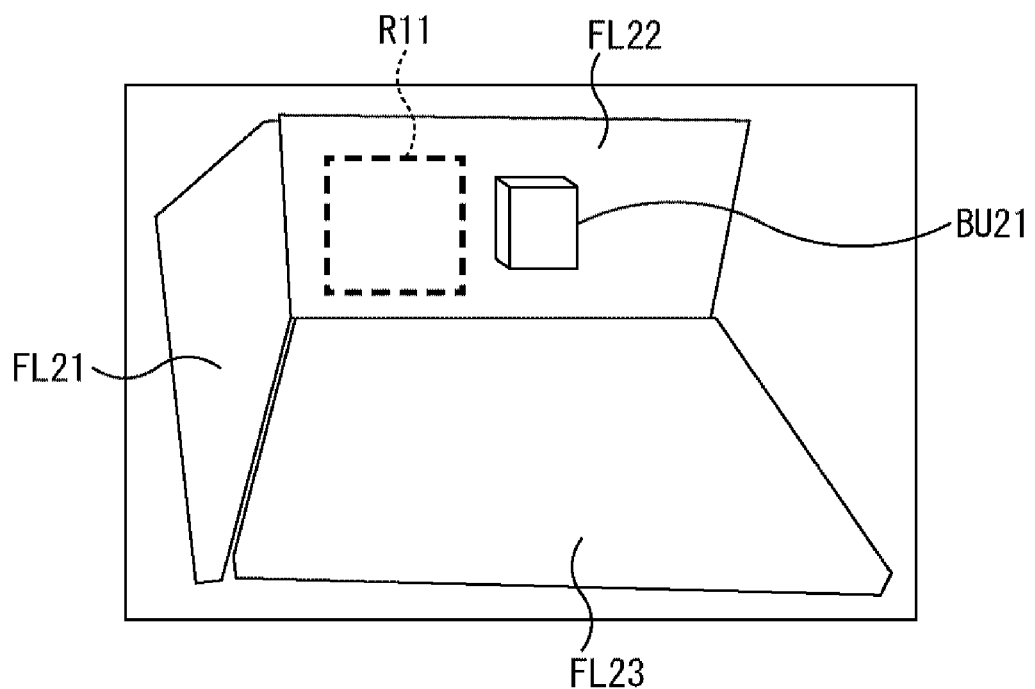
FIG. 6 is a diagram for describing exclusion from a detection plane.

However, for example, as illustrated in FIG. 6, when a target space is a room or the like having a protrusion with a plane, there may be a case where it is desired to exclude the protrusion from the target of plane detection.

In the example illustrated in FIG. 6, there are a wall FL21 corresponding to a shielding object OB12-1, a wall FL22 corresponding to a shielding object OB12-2, and a floor FL23 corresponding to a shielding object OB12-3 in a target space, and a protrusion BU21 is formed on the wall FL22 on the far side in the drawing.

In particular, in this example, the surface of the protrusion BU21 is a plane having a planar shape and a surface parallel to the surface of the wall FL22 corresponding to the shielding object OB12-2.

In this case, when a portion corresponding to the surface of the protrusion BU21 is detected as a plane by plane detection processing, the shielding object OB12-2 is erroneously detected as the shielding object corresponding to the detection plane. Therefore, it is necessary to exclude the surface of the protrusion BU21 as described above from the detection plane.

Therefore, for example, the area (size) of a predetermined plane region R11 larger than the surface of the protrusion BU21 that causes erroneous detection at the time of plane detection processing may be held as a threshold value th, and a plane having a size equal to or larger than the threshold value th may be used as the detection plane.

Figure 7:
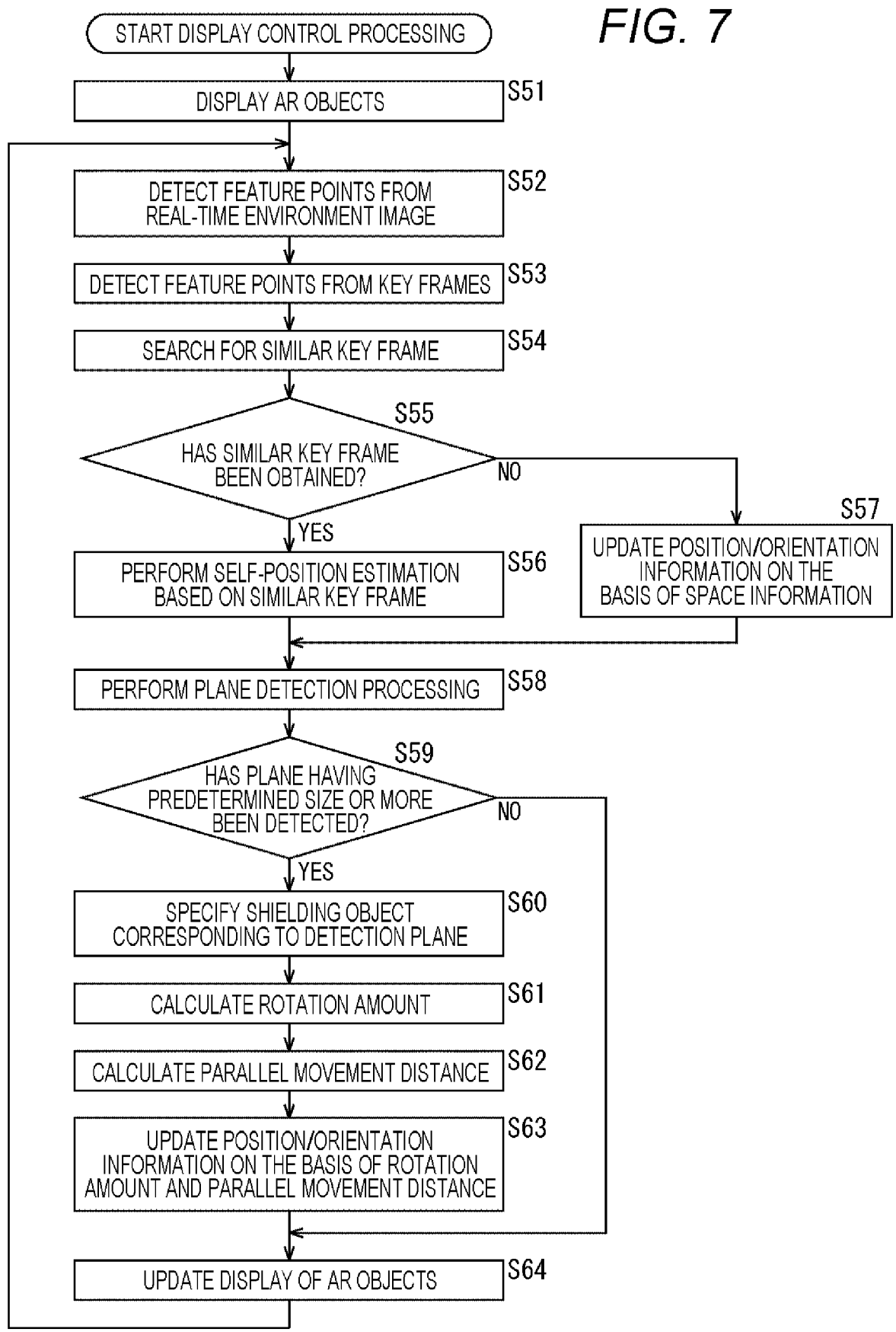
FIG. 7 is a flowchart for describing display control processing.

In a case where the plane detection processing using the threshold value th is performed in this manner, an information processing device 11 performs, for example, display control processing illustrated in FIG. 7.

Hereinafter, display control processing by the information processing device 11 will be described with reference to the flowchart of FIG. 7. Note that processing of steps S51 to S58 is similar to the processing of steps S11 to S18 in FIG. 5, and thus the description thereof will be omitted.

In step S59, a plane detection processing unit 73 determines whether or not a plane having a size equal to or larger than the threshold value th held in advance in the plane detection processing in step S58, that is, a plane having a size equal to or larger than the predetermined size indicated by the threshold value th has been detected.

Figure 5:
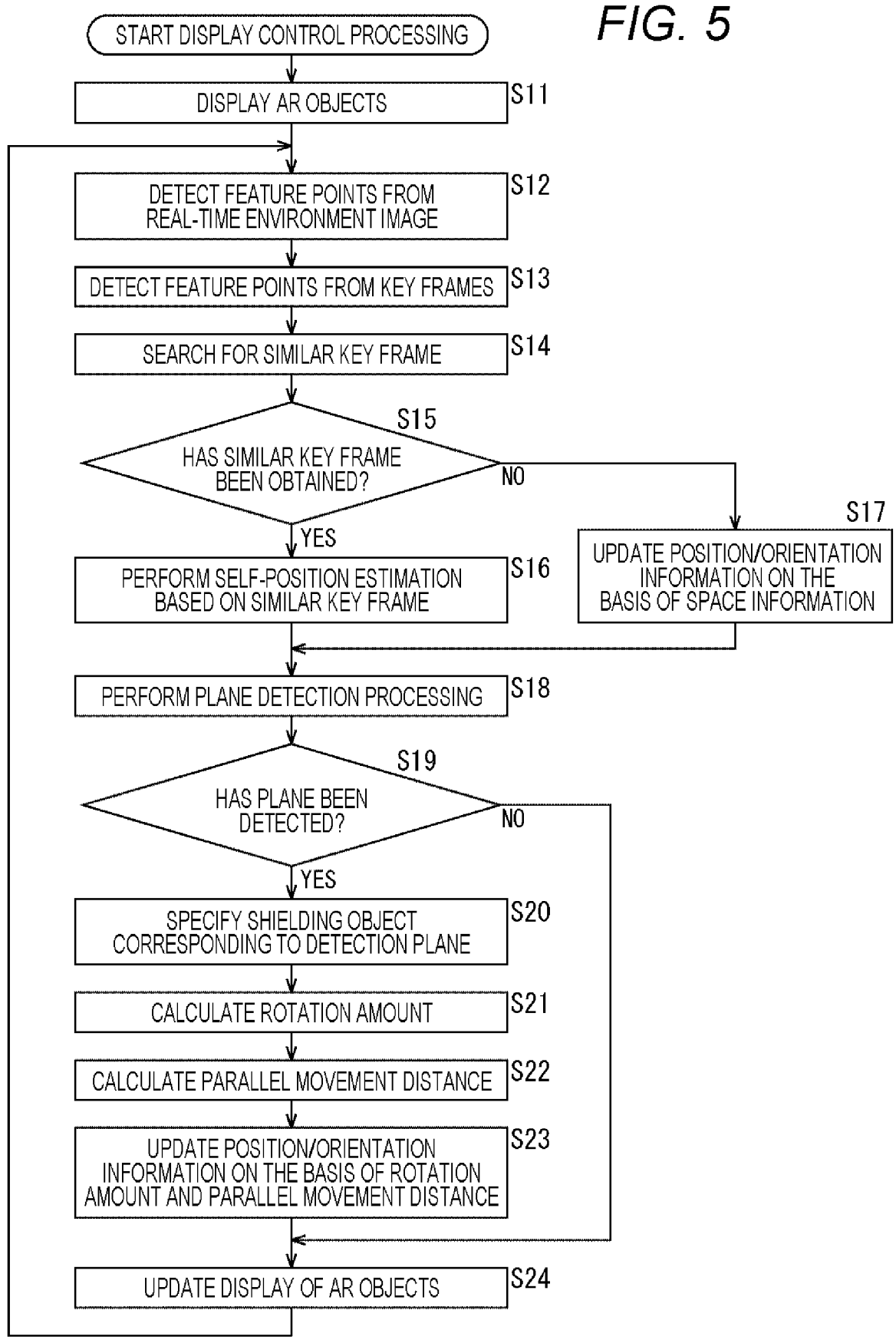
FIG. 5 is a flowchart for describing display control processing.

In a case where it is determined in step S59 that a plane having the predetermined size or more is detected, thereafter, processing of steps S60 to S63 is performed, but since the series of processing is similar to the processing of steps S20 to S23 in FIG. 5, the description thereof will be omitted.

In this case, the plane having the predetermined size or more is set as the detection plane, and the processing of steps S60 to S63 is performed. Furthermore, after the processing of step S63 is performed and position/orientation information is updated, the processing proceeds to step S64.

On the other hand, in a case where it is determined in step S59 that a plane having the predetermined size or more has not detected, thereafter, the processing proceeds to step S64.

In a case where the processing of step S63 is performed or it is determined in step S59 that a plane having the predetermined size or more has not been detected, an output information control unit 65 updates the display of the AR objects in step S64.

Note that processing of step S64 is similar to the processing in step S24 in FIG. 5, and thus the description thereof will be omitted. After the processing of step S64 is performed, the processing returns to step S52, and the above-described processing is repeatedly performed until an AR application is terminated.

As described above, the information processing device 11 performs the plane detection processing to detect a plane having a predetermined size or more, and updates the position/orientation information on the basis of the detection result.

In this manner, the AR objects can be more easily displayed at accurate positions. In particular, in this case, it is possible to prevent an unintended plane from being detected and to obtain more accurate position/orientation information.

Third Embodiment

<About Plane Detection Processing>

Figure 8:
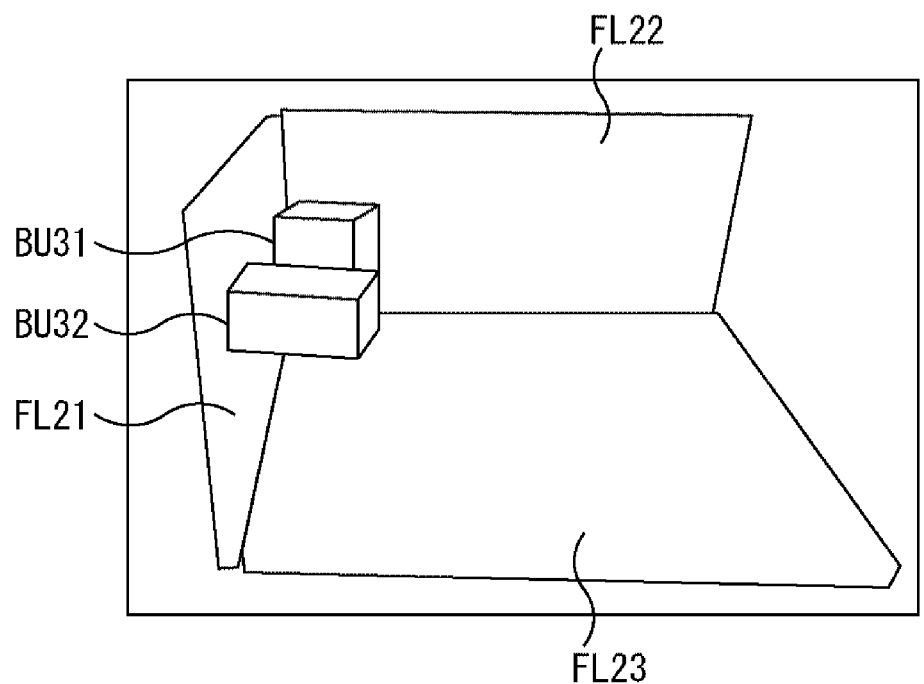
FIG. 8 is a diagram for describing exclusion from a detection plane.

Furthermore, for example, as illustrated in FIG. 8, when a target space is a room having various protrusions, that is, a room or the like having a wall with an incomplete plane, there is a case where it is desired to exclude a plane itself in the direction of the protrusions from the target of a detection plane. Note that, in FIG. 8, parts corresponding to those in FIG. 6 are denoted by the same reference signs, and the description thereof will be omitted as appropriate.

In the example illustrated in FIG. 8, the target space includes a wall FL21, a wall FL22, and a floor FL23. In particular, a protrusion BU31 and a protrusion BU32 protruding rightward in the drawing are formed in a part of the wall FL21, and there is a case where it is desired to exclude the wall FL21 as described above from the detection plane.

In such a case, for example, it is only required to adopt a configuration in which, even if the wall FL21, that is, a plane in the left direction in the drawing is detected, position/orientation information is not updated (corrected).

This configuration can be implemented, for example, if a shielding object OB12-1 corresponding to the wall FL21 is excluded from candidates for the shielding object corresponding to the detection plane in display control processing described with reference to FIGS. 5 and 7.

As described in the first to third embodiments above, according to the present technology, the following effects can be obtained while AR objects can be arranged at absolute positions in the stage of creating an AR application, which is an advantage of self-position estimation based on MapDB.

That is, according to the present technology, it is possible to correct (update) the position/orientation information even in a case where no feature points are detected from a real-time environment image in a target space including planes, such as an indoor space including planes such as a floor and a wall, or an outdoor space including planes such as a building and a road, for example. That is, even in a case where there is a portion having no feature points in the target space, it is possible to appropriately update the position/orientation information to obtain more accurate position/orientation information.

Moreover, in the present technology, it is sufficient to generate object information for the target space, and it is not necessary to arrange a QR code or the like at a specific position in the target space. Therefore, advance preparation and the like are not complicated, and versatility is high.

Furthermore, even in a case where a space including an incomplete plane, such as a space including a wall having a protrusion, is set as a target space, providing parameters such as the threshold value th described above and designation information indicating a shielding object to be excluded makes it possible to prevent erroneous detection in plane detection. As a result, more accurate position/orientation information can be obtained.

Moreover, since more accurate position/orientation information can be obtained, it is possible to improve a feeling of fusion between a real object such as a wall or a floor and the AR objects in the AR application. That is, it is possible to implement more accurate display of the AR objects, for example, a non-shielding object can be displayed at a correct position along a desired wall, and display can be performed such that the non-shielding object cannot be seen by being hidden behind a wall or the like.

Configuration Example of Computer

Incidentally, the series of processing described above can be executed by hardware or software. In a case where the series of processing is executed by software, programs constituting the software are installed in a computer. Here, the computer includes a computer embedded in dedicated hardware, a general-purpose personal computer, for example, capable of executing various functions by installing various programs, and the like.

FIG. 9 is a block diagram illustrating a configuration example of hardware of the computer that executes the above-described series of processing by a program.

In the computer, a CPU 501, a ROM 502, and a RAM 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, for example, the CPU 501 loads a program recorded in the recording unit 508 into the RAM 503 via the input/output interface 505 and the bus 504, and executes the program to perform the series of processing described above.

The program executed by the computer (the CPU 501) can be provided by being recorded in the removable recording medium 511 as a package medium or the like, for example. The program can also be provided via a wired or wireless transmission medium such as a local area network, the Internet, or digital satellite broadcasting.

In the computer, the program can be installed in the recording unit 508 via the input/output interface 505 by the removable recording medium 511 being mounted on the drive 510. Furthermore, the program can be received by the communication unit 509 via the wired or wireless transmission medium and installed in the recording unit 508. In addition, the program can be installed in advance in the ROM 502 or the recording unit 508.

Note that the program executed by the computer may be a program in which the processing is performed in time series in the order described in the present specification, or may be a program in which the processing is performed in parallel or at a necessary timing such as when a call is made.

Furthermore, embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or shared and executed by a plurality of devices.

Moreover, in a case where one step includes a plurality of sets of processing, the plurality of sets of processing included in the one step can be executed by one device or shared and executed by a plurality of devices.

Furthermore, the present technology can also have the following configurations.

(1)

An information processing device including:

a first self-position estimation unit that performs a first self-position estimation on the basis of an environment image whose subjects are surroundings of the information processing device; and a second self-position estimation unit that performs a second self-position estimation on the basis of a detection plane detected from the environment image and object information generated in advance and related to a shielding AR object having a planar shape to correct a display position of a non-shielding AR object according to a result of the first self-position estimation on the basis of a result of the second self-position estimation.

(2)

The information processing device according to (1), in which the second self-position estimation unit performs the second self-position estimation after the first self-position estimation is performed and before the first self-position estimation is performed next time.

(3)

The information processing device according to (1) or (2), in which the second self-position estimation unit corrects the result of the first self-position estimation on the basis of the result of the second self-position estimation to correct the display position.

(4)

The information processing device according to (3), in which the second self-position estimation unit obtains a rotation amount of the shielding AR object with respect to the detection plane as the result of the second self-position estimation on the basis of the object information and a self-position and orientation obtained as the result of the first self-position estimation, and corrects the orientation obtained as the result of the first self-position estimation on the basis of the rotation amount.

(5)

The information processing device according to (4), in which the second self-position estimation unit further obtains a distance between the shielding AR object rotated on the basis of the rotation amount and the detection plane as the result of the second self-position estimation, and corrects the self-position obtained as the result of the first self-position estimation on the basis of the distance.

(6)

The information processing device according to any one of (3) to (5), further including a sensor processing unit that corrects the result of the first self-position estimation on the basis of a detection result obtained by a sensor detecting a motion of the information processing device in a case where the first self-position estimation is not capable of being performed, in which the second self-position estimation unit further corrects the result of the first self-position estimation corrected by the sensor processing unit on the basis of the result of the second self-position estimation.

(7)

The information processing device according to any one of (1) to (6), in which the second self-position estimation unit performs the second self-position estimation in a case where the detection plane having a predetermined size or more is detected.

(8)

An information processing method performed by an information processing device, the information processing method including:

performing a first self-position estimation on the basis of an environment image whose subjects are surroundings of the information processing device; and performing a second self-position estimation on the basis of a detection plane detected from the environment image and object information generated in advance and related to a shielding AR object having a planar shape to correct a display position of a non-shielding AR object according to a result of the first self-position estimation on the basis of a result of the second self-position estimation.

(9)

A program for causing a computer to execute processing including steps of:

performing a first self-position estimation on the basis of an environment image whose subjects are surroundings of an information processing device; and performing a second self-position estimation on the basis of a detection plane detected from the environment image and object information generated in advance and related to a shielding AR object having a planar shape to correct a display position of a non-shielding AR object according to a result of the first self-position estimation on the basis of a result of the second self-position estimation.

REFERENCE SIGNS LIST

11 Information processing device
61 Space information acquisition unit
62 Space information management unit
63 Data management unit
64 Output information generation unit
65 Output information control unit
71 Self-position estimation unit
72 Sensor processing unit
73 Plane detection processing unit

The invention claimed is:

1. An information processing device, comprising:
a central processing unit (CPU) configured to:
perform a first self-position estimation based on an environment image whose subjects are surroundings of the information processing device;
detect a detection plane from the environment image;
acquire object information related to a non-shielding AR object and a shielding AR object that has a planar shape;
perform a second self-position estimation based on the detection plane detected from the environment image and the object information,
wherein a display position of the non-shielding AR object is based on a result of the first self-position estimation; and correct the display position of the non-shielding AR object based on a result of the second self-position estimation.

2. The information processing device according to claim 1, wherein the CPU is further configured to perform the second self-position estimation after the first self-position estimation is performed and before the first self-position estimation is performed next time.

3. The information processing device according to claim 1, wherein the CPU is further configured to correct the result of the first self-position estimation based on the result of the second self-position estimation to correct the display position.

4. The information processing device according to claim 3, wherein the CPU is further configured to:
obtain a rotation amount of the shielding AR object with respect to the detection plane as the result of the second self-position estimation, based on the object information, and a self-position and an orientation obtained as the result of the first self-position estimation; and
correct, based on the rotation amount, the orientation obtained as the result of the first self-position estimation.

5. The information processing device according to claim 4, wherein the CPU is further configured to:
obtain, as the result of the second self-position estimation, a distance between the detection plane and the shielding AR object rotated based on the rotation amount; and
correct, based on the distance, the self-position obtained as the result of the first self-position estimation.

6. The information processing device according to claim 3, wherein the CPU is further configured to:
correct the result of the first self-position estimation based on a detection result obtained by a sensor detecting a motion of the information processing device in a case where the first self-position estimation is not capable of being performed; and
correct the corrected result of the first self-position estimation based on the result of the second self-position estimation.

7. The information processing device according to claim 1, wherein the CPU is further configured to:
detect the detection plane having a specific size; and
perform the second self-position estimation based on the detection of the detection plane having the specific.

8. An information processing method performed by an information processing device, the information processing method comprising:
performing a first self-position estimation based on an environment image whose subjects are surroundings of the information processing device;
detecting a detection plane from the environment image;
acquiring object information related to a non-shielding AR object and a shielding AR object that has a planar shape;
performing a second self-position estimation based on the detection plane detected from the environment image and the object information,
wherein a display position of the non-shielding AR object is based on a result of the first self-position estimation; and
correcting the display position of the non-shielding AR object based on a result of the second self-position estimation.

9. A non-transitory computer-readable medium having stored thereon, computer-executable instructions which, when executed by an information processing device, cause the information processing device to execute operations, the operations comprising:
performing a first self-position estimation based on a basis of an environment image whose subjects are surroundings of the information processing device;
detecting a detection plane from the environment image;
acquiring object information related to a non-shielding AR object and a shielding AR object that has a planar shape;
performing a second self-position estimation based on the detection plane detected from the environment image and the object information,
wherein a display position of the non-shielding AR object is based on a result of the first self-position estimation; and
correcting the display position of the non-shielding AR object based on a result of the second self-position estimation.

* * * * *